Aug. 7, 1956  L. E. CHAMBERLAIN  2,757,818
PANEL AND BOX CONSTRUCTION
Filed Oct. 27, 1953
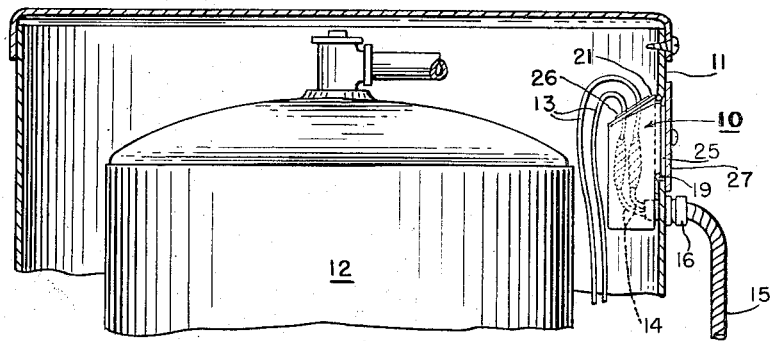
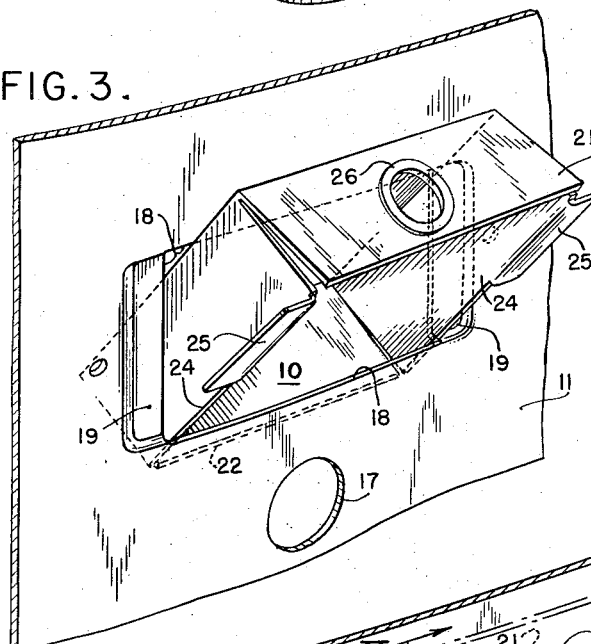
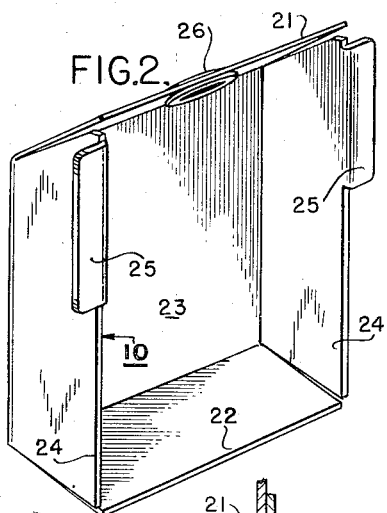
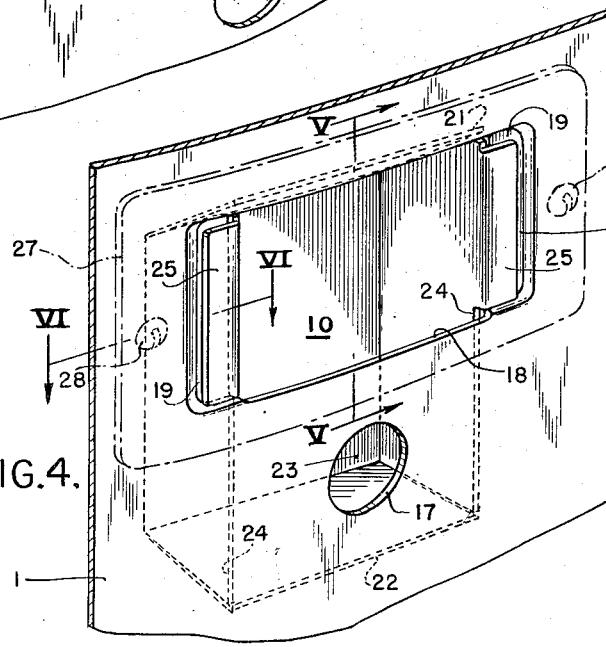
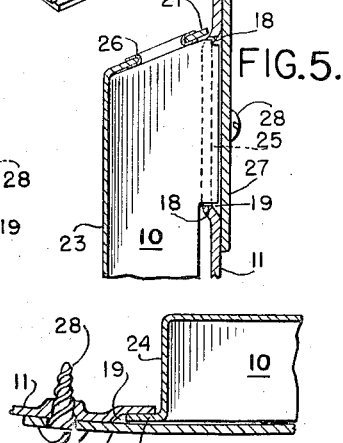
INVENTOR
LAWRENCE E. CHAMBERLAIN
BY
ATTORNEY

United States Patent Office 2,757,818
Patented Aug. 7, 1956

2,757,818

PANEL AND BOX CONSTRUCTION

Lawrence E. Chamberlain, Mansfield, Ohio, assignor to Westinghouse Electric Corporation, East Pittsburgh, Pa., a corporation of Pennsylvania Application October 27, 1953, Serial No. 388,645

1 Claim. (Cl. 220—3.5)

My invention relates to an assembly of a box upon a panel and has for an object to provide an improved construction of this kind.

A further object of the invention is to provide a construction of the class set forth wherein a box may be attached to a rear or relatively inaccessible side of a panel from the front side thereof without the use of separate fastening devices.

While my invention may be employed generally for the attachment of a box to a panel, it is particularly adaptable to the securing of a junction box for electric wires to a panel member such as, for example, the casing of a water heater. In practicing the invention, the panel of the device to which the box is to be attached is provided with an opening of a size and configuration to permit the passage of the box in a manner to be described. The box may include a back wall, top and bottom walls and side wall, the front side of the box being open. Respective flanges extend outwardly from the front edges of upper portions of the sidewalls, in a plane normal to the planes of the sidewalls. When assembled to the panel, the open front of the box is adjacent the rear or relatively inaccessible side of the panel and the flanges extend through the opening in the panel and overlie the side margins of the opening.

In the assembly of the box to the panel, the lower portion of the box is inserted in the opening until the lower edges of the flanges engage the front side of the panel. The box is then swung upwardly and inwardly through the opening, the bottom edges of the flanges pivoting about the bottom edge of the opening. The top wall of the box may be flexibly carried and is slightly deflected downwardly by the top edge of the opening during the swinging of the box therethrough. When the box is moved to its proper position, the top snaps upwardly into engagement with the rear side of the panel and retains the box in position. The interior of the box is accessible through the opening in the panel for operations within the box. The opening in the panel may be closed by a cover in any suitable manner.

The foregoing and other objects are effected by the invention as will be apparent from the following description taken in connection with the accompanying drawings, forming a part of this application, in which:

Fig. 1 is a vertical section of a portion of a water heater having a junction box secured to the outer casing in accordance with my invention;

Fig. 2 is a perspective view of the box shown in Fig. 1;

Fig. 3 is a perspective view showing a step in the assembly of the box to the casing;

Fig. 4 is a perspective view showing the box in position on the casing; and

Figs. 5 and 6 are sections taken along the respective lines V—V and VI—VI of Fig. 4.

Reference will now be had to the drawings wherein I have shown a junction box 10 constructed and arranged in accordance with my invention and applied to the outer casing 11 of a water heater, the tank of which is shown at 12. The electrical heater (not shown) is provided with supply conductors 13 which extend from the heaters to the junction box 10 and are connected to service wires 14 which may be encased in a flexible armored shell 15. The latter is provided with a suitable fitting 16 adapted for mounting in a hole 17 formed in the outer shell or panel 11. It will be understood that the supply conductors 13 and the service conductors 14 are spliced and taped within the box 10.

As shown in Figs. 3, 4 and 5, the outer panel or casing 11 is provided with a generally rectangular opening 18 which communicates with the interior of the box 10 when the latter is in position on the rear side of the panel 11. For a purpose to be referred to hereinafter, portions of the panel 11 adjacent the side margins of the opening 18 are indented, as shown at 19.

The junction box 10 is best shown in Fig. 2 and includes a top wall 21, a bottom wall 22, a rear wall 23 and side walls 24. It will be noted that the front side of the box 10 is open. The upper portions of the side walls 24 are provided with respective flanges 25 which extend outwardly from the side walls in a plane normal to the planes of the side walls. The top wall 21 may be provided with a smooth edged eyelet 26 through which the supply conductors 13 are passed.

In the assembly of the box to the panel or casing 11, the box may be slid through the opening 18, as shown in Fig. 3 until the bottom of the flanges 25 engages the outer surface of the panel 11. In the embodiment shown, the flanges 25 engage the lower corner of the indented portions 19. After engagement of the flanges 25 and the panel 11, the box 10 is then swung inwardly and upwardly through the opening 18 to its normal position, as shown in Fig. 4. As shown, the top wall 21 is supported solely at its rear edge and is bendable about the rear wall. During the swinging movement just referred to, the top wall 21 will be flexed downwardly by the top edge of the opening 18 until the box is in its normal position, at which time, the top wall 21 will spring upwardly to the rear of the panel 11 for retaining the box 10 in its proper position. The opening 18 may be closed by a cover 27 secured to the panel 11 in any well understood manner, such as for example, by means of sheet metal screws 28.

From the foregoing description it will be apparent that I have provided an improved box construction for assembly on a panel or casing wherein the box may be actuated to its proper position through an opening in the panel and without the use of fastening devices. The box is positively retained in its proper operating position. The attachment of the box to the panel may be readily completed even though one side of the panel is relatively inaccessible. The opening in the panel defines an access opening for the box which opening may be readily closed by a suitable cover.

While the invention has been shown in but one form, it will be obvious to those skilled in the art that it is not so limited, but is susceptible of various changes and modifications without departing from the spirit thereof.

What is claimed is:

In a panel and box assembly of the class set forth, the combination of a panel having an opening formed therein, an open front box having a rear wall and top, bottom and side walls, respective flange members formed on upper portions of the side walls and extending outwardly from the front edges thereof, said box being disposed on one side of the panel with its open side adjacent the panel and said flange members extending through the opening in the panel and engaging the opposite side of the panel; said box being so formed that, during assembly to the panel, the lower portion thereof may pass through the opening in the panel until the bottom edges of the flange members engage the panel, said box being then swung with the bottoms of the flange members pivoting on the lower margin of the opening in the panel until the box is positioned on said one side of the panel with said flanges engaging said opposite side of the panel, said top wall of the box being flexibly supported for deflection by the top edge of said opening during said swinging movement of the box, said top wall moving upwardly into engagement with said one side of the panel in the assembled position of the box for retaining the box in such position; a cover for the opening in the panel and means for securing the cover to the panel.

References Cited in the file of this patent

UNITED STATES PATENTS

| | | |
|---|---|---|
| 398,579 | Buckley | Feb. 26, 1889 |
| 1,458,356 | O'Kane | June 12, 1923 |
| 1,883,507 | Bond | Oct. 18, 1932 |
| 2,448,359 | Davidson | Aug. 31, 1948 |